United States Patent
Millman et al.

[15] 3,647,021
[45] Mar. 7, 1972

[54] SOUND SUPPRESSION SYSTEM

[72] Inventors: Victor Millman, San Diego; Wallie P. Gray, Chula Vista, both of Calif.

[73] Assignee: Rohr Corporation, Chula Vista, Calif.

[22] Filed: June 22, 1970

[21] Appl. No.: 47,955

[52] U.S. Cl. .......................... 181/33 HC, 181/33 G, 181/51, 239/265.13
[51] Int. Cl. ..................................... B64d 33/06, F02k 1/26
[58] Field of Search ........ 181/33 HB, 33 HC, 33 HD, 33 HA, 181/33 G, 33 HE, 42, 50, 43, 51; 239/265.13

[56] References Cited

UNITED STATES PATENTS

| | | | |
|---|---|---|---|
| 2,916,101 | 12/1959 | Naman | 181/33 G UX |
| 3,039,560 | 6/1962 | Duthion et al. | 181/51 X |
| 3,092,205 | 6/1963 | Brown et al. | 181/33 HC UX |
| 3,439,774 | 4/1969 | Callaway et al. | 181/33 G UX |
| 3,481,427 | 12/1969 | Dobbs et al. | 181/33 G UX |

FOREIGN PATENTS OR APPLICATIONS

| | | | |
|---|---|---|---|
| 1,007,554 | 10/1965 | Great Britain | 181/33 HC |

Primary Examiner—Richard B. Wilkinson
Assistant Examiner—John F. Gonzales
Attorney—George E. Pearson

[57] ABSTRACT

System includes a shroud immediately downstream of jet engine discharge and connected to nozzle to form continuation thereof and confine and direct the flow of the gaseous stream. Shroud is corrugated in axial direction to form peripherally spaced, radially extending lobes to serve as discrete discharge passages for gaseous stream. Valleys between lobes define flow paths for free stream air to flow between lobes and mix with gaseous stream at fluted margin to attenuate noise. Sound absorbing panels are inserted in some or all of the lobes to further attenuate noise. The panels are preferably planar and extend radially and axially in the lobes to divide them into additional discharge passages. Each panel comprises planar solid septum, honeycomb core in each face, and a face sheet on each honeycomb core, all secured together to form rigid panel, preferably of metal to further serve as reinforcement for lobe. Multiplicity of apertures in face sheets communicate with core cavities to form multiplicity of sound traps so that each face has sound absorbing characteristics. System may be used with fan jet engine if fan air exhausts into same discharge zone with turbine gas.

11 Claims, 4 Drawing Figures

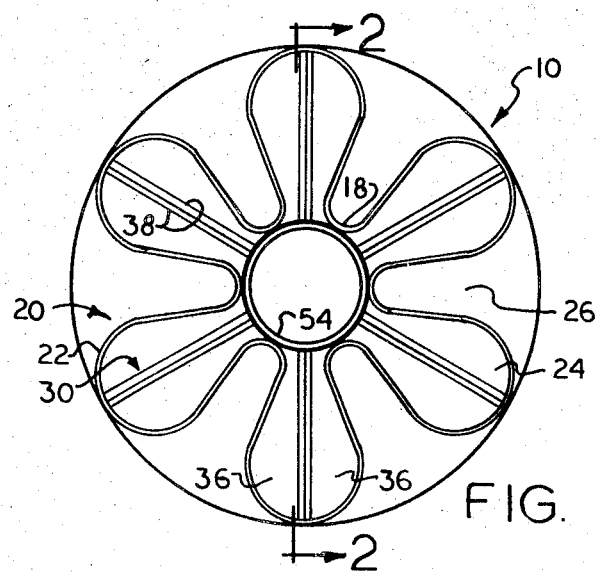
FIG. 1
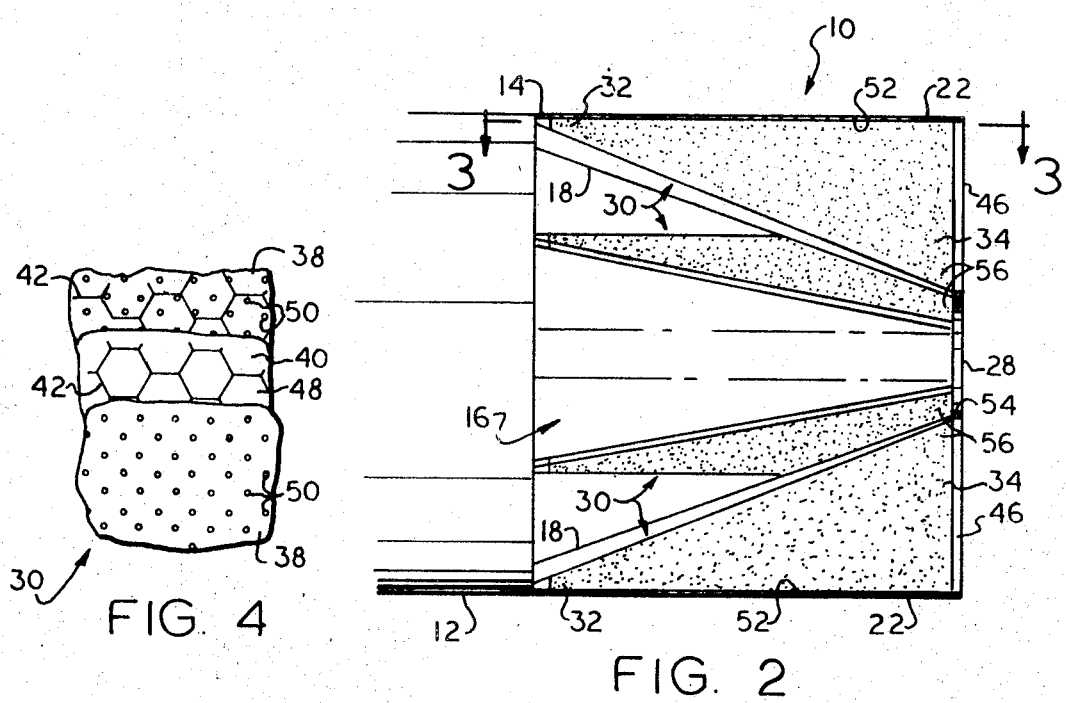
FIG. 4
FIG. 2
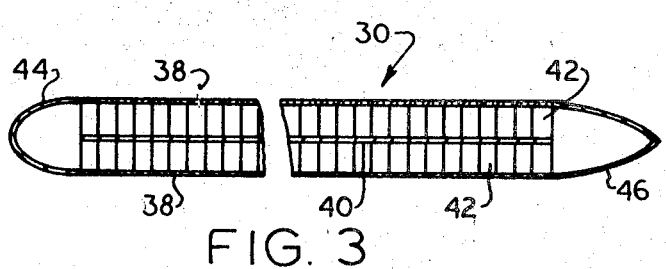
FIG. 3
INVENTOR.
VICTOR MILLMAN
WALLIE P. GRAY
BY George E. Pearson
ATTORNEY

SOUND SUPPRESSION SYSTEM

BACKGROUND OF THE INVENTION

This invention lies in the field of sound suppression of gas turbine or jet engines, which produce reaction thrust by ejecting a high-velocity stream of gas from the exhaust nozzle of tailpipe of the gas turbine. One of the problems of airplanes equipped with jet engines on which a great deal of effort has been expended is that the exhaust stream creates a very high level of sound energy or "noise" in a wide range of frequencies, and a portion of this noise reaches the ground from low flying airplanes, as during takeoff and climb, at an energy level which is not acceptable to the public.

The invention is directed to a system in which free stream air is mixed with the exhaust gas to cool it and to raise the sound frequencies to levels which are more readily attenuated in passing through the atmosphere. It is directed particularly to a system of the type which uses a corrugated or "daisy" nozzle having a plurality of peripherally spaced lobes serving as discrete discharge passages for the propulsion gases, the free stream air flowing through the valleys between the lobes to meet the propulsion gases along the extensive boundary line and mix with them. While these devices reduce the initial sound level to an appreciable extent, the remaining sound power is still undesirably high.

SUMMARY OF THE INVENTION

The present invention provides a very noticeable improvement in the sound suppression function with a minimum of equipment and with no moving parts requiring repair and maintenance. Generally stated, the system includes a shroud of the type mentioned above, which is attached to the nozzle and forms a continuation thereof to define a discharge zone and to surround and direct the flow of the gaseous propulsion stream. The forward end of the shroud is preferably circular for attachment to the nozzle and the balance is formed with gradually deepening axially directed corrugations defining a plurality of peripherally spaced lobes which constitute rearwardly directed discharge passages for the gaseous stream. The spaced lobes define between them rearwardly converging flow path valleys for free stream air to enter and mix with the gaseous flow at the fluted exit margin of the shroud. As stated above, this produces a significant attenuation of the engine noise.

The additional noise attenuation provided by this invention results from inserting in some and preferably all of the lobes sound absorbing structures or panels which directly absorb a considerable portion of the noise before the gaseous stream reaches the mixing zone aft of the shroud. In the preferred form the panels are substantially flat or planar, and each panel comprises a solid rigid septum, a honeycomb core on each face of the septum, and a face sheet overlying each core, with all of the components being formed of metal and bonded together to produce a strong rigid panel which may serve the dual purpose of reinforcing a lobe. While the panels may be placed in various positions within the lobes, it is preferred to arrange them so that each panel extends radially and axially, dividing a lobe into two peripherally adjacent discharge passages. The face sheets of each panel are perforated with a multiplicity of small apertures, and a plurality of such apertures communicate with each cavity in the honeycomb core to produce a multiplicity of sound traps. Thus, each face has sound absorbing characteristics and is exposed to the gaseous flow to attenuate the engine noise.

The outer edges of the panels are secured to the inner walls of the lobes at the crests, and the inner end of the base of the panel at the aft edge is secured to a coaxial support ring. This connection between the support ring and the lobe crests serves to reinforce and stabilize the lobes.

BRIEF DESCRIPTION OF THE DRAWINGS

Various other advantages and features of novelty will become apparent as the description proceeds in conjunction with the accompanying drawing, in which:

FIG. 1 is an end view looking forward at a typical installation incorporating the invention;

FIG. 2 is a sectional view taken on line 2—2 of FIG. 1;

FIG. 3 is a sectional view taken on line 3—3 of FIG. 2; and

FIG. 4 is a partial plan view of the panel with parts broken away to show the interior construction.

DESCRIPTION OF PREFERRED EMBODIMENT

The general arrangement of the invention is illustrated in FIGS. 1 and 2, in which a shroud 10 is shown as attached to the aft end of nozzle or tailpipe 12 of the engine, not shown. The forward end 14 of the shroud is circular or cylindrical to conform to the typical circular cross section of the nozzle and is attached thereto by any suitable means to form a virtual continuation of the nozzle. The shroud defines a discharge zone 16 to contain and direct the flow of the gaseous stream.

Starting adjacent to the forward end 14, the balance of the shroud is formed with gradually deepening corrugations 18 extending axially to define a plurality of peripherally spaced and radially extending lobes 20 having crests 22. These lobes are open at their aft ends to constitute rearwardly directed discharge passages 24 for the gaseous stream. They also define between them an equal number of flow passage valleys 26 for free stream air, which passages are of maximum depth at the fluted exit margin 28 of the shroud. The free stream air converging through valleys 26 meets the gaseous stream discharged from the lobes at the exit margin 28. The greatly extended fluted marginal boundary line increases the area of contact to produce maximum mixing and significant noise attenuation.

To substantially increase this attenuation, further means are provided in the form of sound absorbing structures or panels 30. These panels, in preferred form, are substantially flat or planar and one is provided in each lobe, although some may be omitted if desired. As shown, each panel has a planform which conforms to a longitudinal section through a lobe and thus is in the form of an elongate triangle having an apex 32 at its forward end and a base 34 at its aft end. It may also be sized to conform to the longitudinal section of the lobe, and its base may generally be in the plane of the exit margin 28 of the shroud. With this configuration and the location as shown, each panel extends radially and axially within its respective lobe and divides it into two peripherally adjacent discharge passages 36. Although the panels may extend transversely, the form shown is preferred.

Each panel has two generally planar faces 38 and each face is exposed to the gaseous stream. Both faces are sound absorbing and thus they attenuate a very substantial portion of the engine noise as the gaseous stream flows through. Each panel is made up of a planar solid septum 40 on each face of which is placed a honeycomb core 42. A face sheet 38 overlies each honeycomb core and all of the components are bonded together. All of the components are preferably metallic and thus the total panel is both rigid and strong. The leading edge 44 is rounded and the trailing edge 46 is tapered to reduce gaseous flow resistance to a minimum.

As can be seen best in FIG. 4, the honeycomb core provides a multiplicity of discrete sound trapping cells or cavities 48, and each face sheet 38 is perforated with a multiplicity of apertures 50 which are much smaller and more closely spaced than cavities 48. Thus, a plurality of apertures 50 communicate with each cavity 48 to produce a multiplicity of very effective sound traps.

The radially outer margin 52 of each panel is secured along its length to the inner wall of its respective lobe at crest 22. A support ring 54 is located coaxially of the shroud at or near the exit margin 28. The inner end 56 of base 46 of each panel is secured to the support ring in order to stabilize it and, since the panel is rigid and is also secured to the lobe crest, the connection serves the further purpose of stabilizing the lobe itself. As will be seen in FIG. 1, the support ring is also secured to the aft ends of corrugations 18, further stabilizing the lobes.

While the invention is directed primarily to a conventional jet engine it will be apparent that it may be applied equally well to a fan jet type in which the fan air is mixed with the turbine exhaust. In such case nozzle 12 would be the fan air duct and the turbine nozzle would be within the duct, likewise terminating at the forward end of the shroud.

Having thus described the invention, what is claimed as new and desired to be protected by U.S. Letters Patent is:

1. A sound suppression system for a jet engine having a rearwardly discharging nozzle, comprising: a shroud located aft of the nozzle to define a discharge zone and to surround and direct the flow of the gaseous stream; the shroud being corrugated fore and aft to define a plurality of peripherally spaced, radially extending lobes; each lobe constituting a rearwardly directed discharge passage for a portion of the gaseous stream; each pair of adjacent lobes defining between them a flow passage valley for ambient air; the fluted exit margin of the shroud providing an elongated junction line for mixing of the ambient air with the gaseous stream; and discrete sound absorbing structures located in at least some of the lobes and exposed to the flow of the gaseous stream to attenuate the noise transmitted by the engine.

2. A system as claimed in claim 1; the sound absorbing structures extending throughout substantially the full lengths of their respective lobes.

3. A system as claimed in claim 1; the sound absorbing structures comprising panels extending across the lobes to divide them into a plurality of flow passages.

4. A system as claimed in claim 3; the panels extending radially within the lobes and secured to the crests of the lobes to divide them into peripherally adjacent flow passages.

5. A system as claimed in claim 4; and a support ring located in a transverse plane within the aft portion of the shroud; the panels being connected to the ring to retain them in predetermined position.

6. A system as claimed in claim 1; each sound absorbing structure comprising an elongated generally planar panel extending axially within its respective lobe and generally centered in the lobe to divide it into two flow passages; each face of the panel having sound absorbing characteristics and being exposed to the flow of a portion of the gaseous stream.

7. A system as claimed in claim 6; the forward end of the shroud being substantially cylindrical and connected to the nozzle to form a virtual continuation thereof; the crests of the lobes extending rearward at a substantially constant radial distance from the shroud axis; the valleys between the lobes converging rearward; and the panels extending radially and axially within their respective lobes.

8. A system as claimed in claim 7; the panels being formed of rigid metallic material; the panels extending substantially into the radial depths of the lobes and attached to the inner walls of the lobes; a ring for supporting the lobes of the shroud; and the panels being connected to the ring to anchor the panels in position.

9. A system as claimed in claim 8; the support ring also being connected to the lobes at the aft ends of the valleys to further reinforce the lobes.

10. A sound absorbing structure for use within a discharge passage of a jet engine to attenuate the noise transmitted by the engine, comprising: a generally planar panel disposed within the discharge passage and extended longitudinally thereof; the panel being adapted to extend across the passage and divide it into separate adjacent flow paths; the panel having two opposed faces to be exposed to the gaseous stream flowing through the passage; each face having sound absorbing characteristics; the panel comprising a planar solid septum; a honeycomb core on each face of the septum; a planar face sheet overlying each honeycomb core; all of said components being secured together to form a rigid planar structure; and a multiplicity of apertures extending through each face sheet; a plurality of such apertures communicating with each cavity in the honeycomb core.

11. A panel as claimed in claim 10; all of the components of the panel being formed of metallic material to resist the heat of the gaseous flow from the engine and to provide a structure of sufficient strength and rigidity to reinforce the discharge passage.

* * * * *